(12) United States Patent
Yoshida et al.

(10) Patent No.: US 11,064,087 B2
(45) Date of Patent: Jul. 13, 2021

(54) INFORMATION PROCESSING APPARATUS, CONTROL METHOD, AND STORAGE MEDIUM FOR PRINTING

(71) Applicant: CANON KABUSHIKI KAISHA, Tokyo (JP)

(72) Inventors: Takehiro Yoshida, Tokyo (JP); Yusuke Shirakawa, Kawasaki (JP); Hiroshi Atobe, Kawasaki (JP); Yusuke Haruyama, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/796,669

(22) Filed: Feb. 20, 2020

(65) Prior Publication Data

US 2020/0274984 A1 Aug. 27, 2020

(30) Foreign Application Priority Data

Feb. 27, 2019 (JP) .............................. JP2019-034905

(51) Int. Cl.
*H04N 1/23* (2006.01)
*H04N 1/00* (2006.01)

(52) U.S. Cl.
CPC ......... *H04N 1/233* (2013.01); *H04N 1/00336* (2013.01)

(58) Field of Classification Search
None
See application file for complete search history.

(56) References Cited

U.S. PATENT DOCUMENTS

| 9,594,947 B1* | 3/2017 | Kotagiri ............... G06K 9/6206 |
| 2009/0208068 A1* | 8/2009 | Tsunoda ............. H04N 1/00962 |
| | | 382/118 |

FOREIGN PATENT DOCUMENTS

| JP | 2000221610 A | * | 8/2000 |
| JP | 2009-181171 A | | 8/2009 |

OTHER PUBLICATIONS

English translation of Japanese Patent Application H11-024802 corresponding to Japanese Publication 2000-221610 (Abstract). (Year: 2000).*

* cited by examiner

*Primary Examiner* — Thomas D Lee
(74) *Attorney, Agent, or Firm* — Canon U.S.A., Inc. IP Division

(57) ABSTRACT

An information processing apparatus includes a registration unit configured to register information on a certain person before acquiring image data to be printed, a specification unit configured to specify a number of certain persons in the image data to be printed based on the image data to be printed and the information on the certain person, a determination unit configured to determine a number of copies to be printed based on a number of people obtained by subtracting the specified number of certain persons from a number of people detected from the image data to be printed, and an instruction unit configured to give an instruction for printing the determined number of copies.

21 Claims, 14 Drawing Sheets

FIG.12

| ID | NUMBER OF COPIES | DISTANCE | PRINTING STATUS | IMAGE ID | PHOTO FRAME ID | REQUEST | SMARTPHONE ID |
|---|---|---|---|---|---|---|---|
| 101 | 1 | 150 METERS OR LESS AWAY | COMPLETED | 101.jpg | F101 | PRINT | 111.111.111.111 |
| 101 | 1 | 150 METERS OR LESS AWAY | CURRENTLY BEING PRINTED | 102.jpg | F101 | PRINT | 222.222.222.222 |
| 102 | 1 | | NOT STARTED | 103.jpg | F102 | PRINT | 333.333.333.333 |
| 104 | 1 | | | 104.jpg | | | 444.444.444.444 |
| 105 | 1 | | | 105.jpg | | | |

INFORMATION PROCESSING APPARATUS, CONTROL METHOD, AND STORAGE MEDIUM FOR PRINTING

BACKGROUND

Field of the Disclosure

The present disclosure relates to an information processing apparatus, a control method, and a storage medium.

Description of the Related Art

There is provided a service that offers printing of image data of a picture taken by a camera operator. A server manages identification information and image data of the picture taken by the camera operator in association with each other. Japanese Patent Application Laid-Open No. 2009-181171 discusses a printing technique using image data associated with identification information included in a printing request.

However, Japanese Patent Application Laid-Open No. 2009-181171 does not take into consideration a method for reducing a waiting time that may occur to receive a printed material.

SUMMARY

According to embodiments of the present disclosure, an information processing apparatus includes a registration unit configured to register information on a certain person before acquiring image data to be printed, a specification unit configured to specify a number of certain persons in the image data to be printed based on the image data to be printed and the information on the certain person, a determination unit configured to determine a number of copies to be printed based on a number of people obtained by subtracting the specified number of certain persons from a number of people detected from the image data to be printed, and an instruction unit configured to give an instruction for printing the determined number of copies.

Further features of the present disclosure will become apparent from the following description of exemplary embodiments with reference to the attached drawings.

BRIEF DESCRIPTION OF THE DRAWINGS

FIG. 12 is a diagram illustrating an example of a table managed by the server.

DESCRIPTION OF THE EMBODIMENTS

Figure 1:
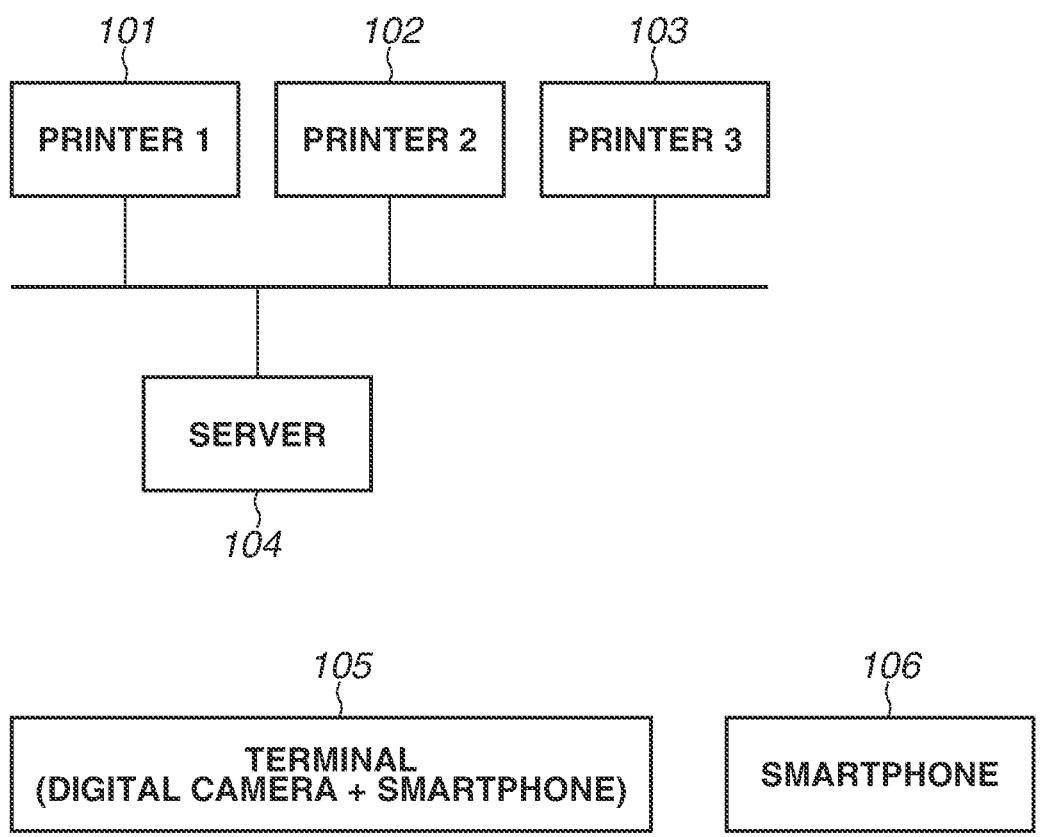
FIG. 1 is a block diagram illustrating an example of a system configuration.

FIG. 1 illustrates a system configuration for implementing a first exemplary embodiment. In a system in FIG. 1, three printers 101 to 103 are connected with a server 104 via Ethernet®. The number of printers that can connect with the server 104 is not limited to three. A terminal 105 is a terminal carried by a camera operator. The terminal includes a digital camera of the camera operator and a smartphone of the camera operator connected to each other via a universal serial bus (USB). Image data of an image captured with the digital camera is transmitted via the USB to the smartphone of the camera operator and is transmitted to the server 104 using the smartphone of the camera operator. For example, image data of the image is transmitted to the server 104 using a 5G communication function of the smartphone. For example, in a case where the digital camera is capable of transmitting the image data to the server 104 via wireless communication using 5G or the like, the terminal 105 may include only the digital camera. A smartphone 106 is a terminal carried by a spectator described below. In an exemplary embodiment of the present exemplary embodiment, the server 104 is also referred to as an information processing apparatus.

If the camera operator receives a request from a spectator to take a picture of the spectator, the camera operator captures an image, for example, of the spectator and a player together. The camera operator has a sheet of paper on which identification (ID) and a barcode corresponding to the ID are printed. In the present exemplary embodiment, such a sheet is hereinafter referred to as an ID sheet. When starting image capturing, the camera operator first captures images of the ID and the barcode printed on the ID sheet using the digital camera and then captures an image of the spectator. Then, the camera operator hands the ID sheet to the spectator. The information on the ID sheet is to be used at the time of actual printing, which is described in detail below with reference to, for example, FIG. 5.

Figure 2:
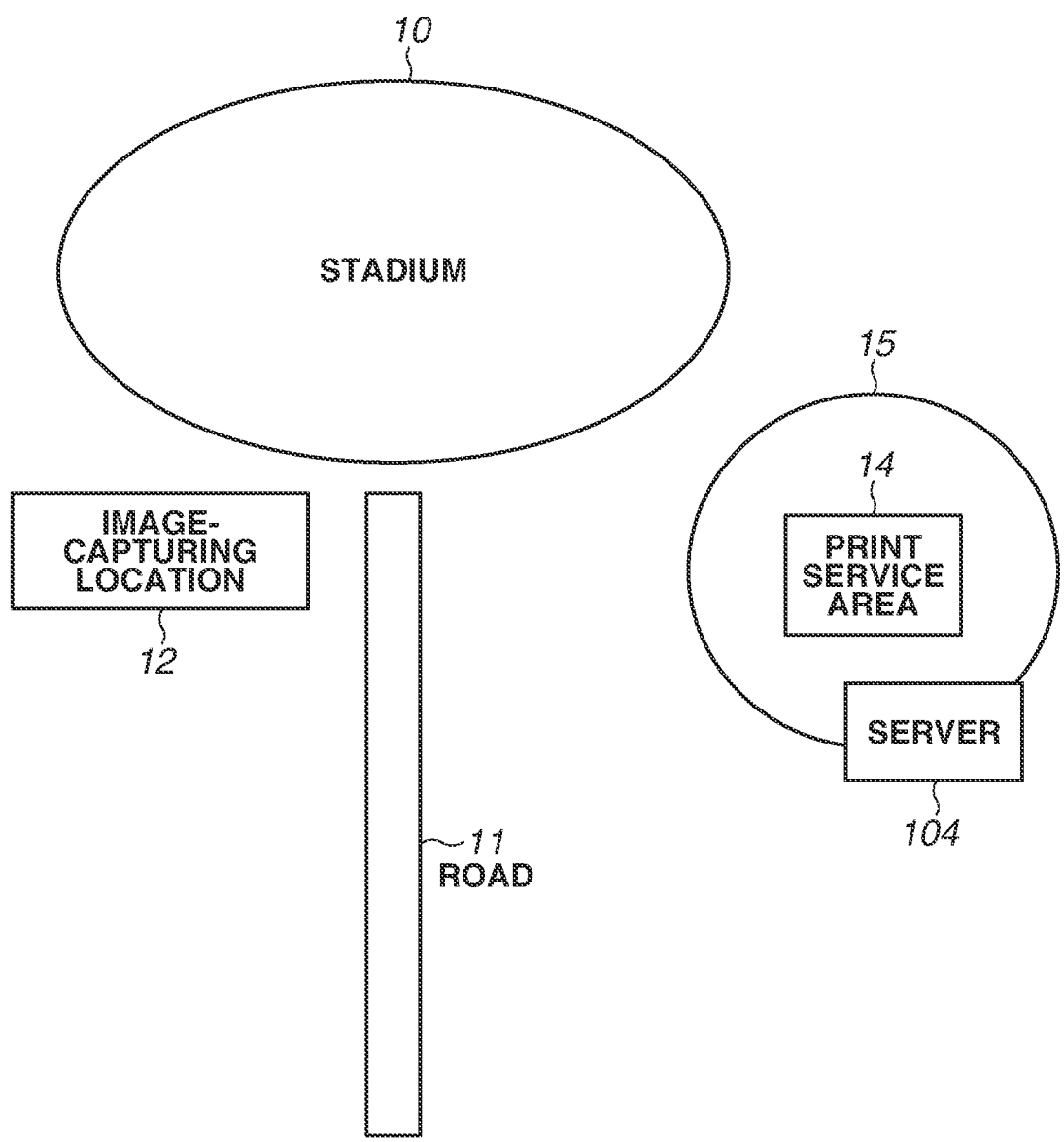
FIG. 2 is a block diagram illustrating an example of a stadium.

Next, an overall view of a stadium is illustrated in FIG. 2. The overall view includes a stadium 10 and a road 11 that is used, for example, when people go to the stadium 10 from the nearest station.

The overall view also includes an image-capturing location 12. The camera operator takes a picture of a spectator who has stopped by the location. A player may be waiting in the image-capturing location 12. The overall view also includes a print service area 14. The spectator is to have his/her picture taken, for example, in the image-capturing location 12 by the camera operator before a game starts. After spectating the game, the spectator receives the picture at the print service area 14 and goes home. The overall view further includes an area 15 for starting printing. For example, if the server 104 detects that the spectator has entered the area 15 on his/her way home to receive the picture, the server 104 instructs any one of the printers 101 to 103 to start printing.

Figure 3:
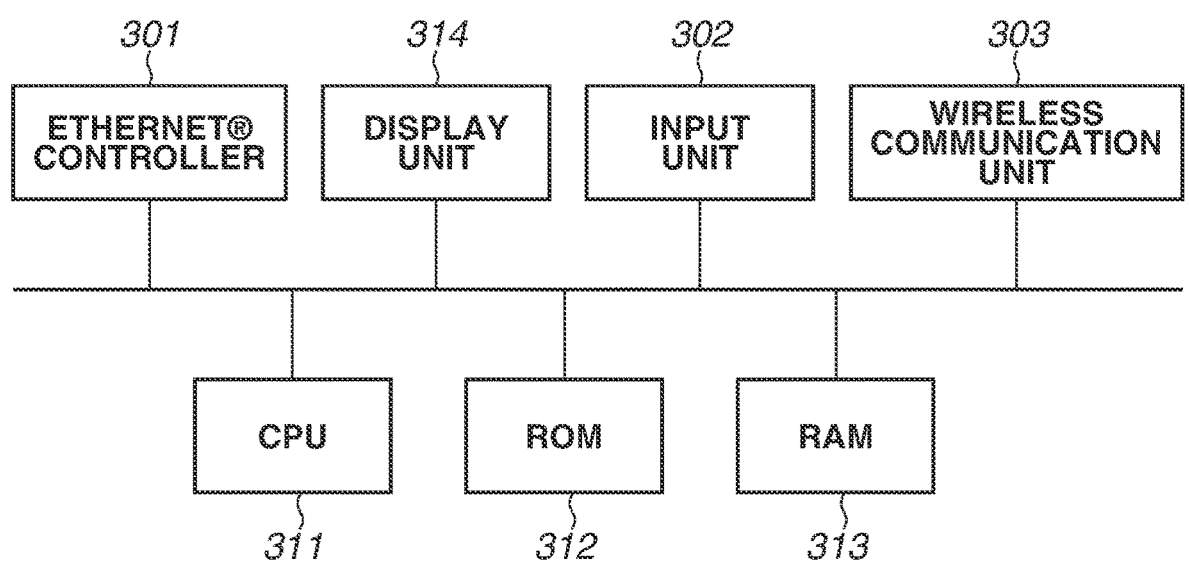
FIG. 3 is a block diagram illustrating an example of a hardware configuration of a server.

Next, a diagram illustrating a hardware configuration of the server 104 is described using FIG. 3. A central processing unit (CPU) 311 is a processor for controlling each function to be executed by the server 104 described below. A read-only memory (ROM) 312 stores fixed data such as a control program to be executed by the CPU 311, a data table, and a built-in operating system (OS) program therein. In the present embodiment, each control program stored in the ROM 312 is used for controlling software execution such as scheduling, task switching, and interrupt handling under the management of the built-in OS program stored in the ROM 312. A random access memory (RAM) 313 is used by the CPU 311 for temporary storage and buffering of data as appropriate. An Ethernet® controller 301 controls communication with a wired local area network (LAN). The Ethernet® controller 301 controls communication with, for example, the printers 101 to 103 connected to the wired LAN.

An input unit 302 is, for example, a keyboard and is used for setting the number of cameras, specifications of the cameras, the number of printers, and specifications of the printers. A wireless communication unit 303 is used for performing wireless communication. The wireless communication to be performed here may be wireless communication using 4G or 5G or may be wireless communication based on the IEEE 802.11 series. Herein, 4G refers to the fourth generation mobile communication system, and 5G refers to the fifth generation mobile communication system. A communication speed of 5G is higher than the communication speed of 4G. In 5G, frequencies in the 3.6 to 6.0 GHz bands and in the 28 GHz band can be used in addition to frequency bands of 3.6 GHz or less used in 4G.

The server 104 receives the image data of the image captured by the camera operator via the wireless communication unit 303 and stores the image data in association with ID information in a table as illustrated in FIG. 12 described below. The display unit 314 displays various kinds of information input to the server 104.

Figure 4:
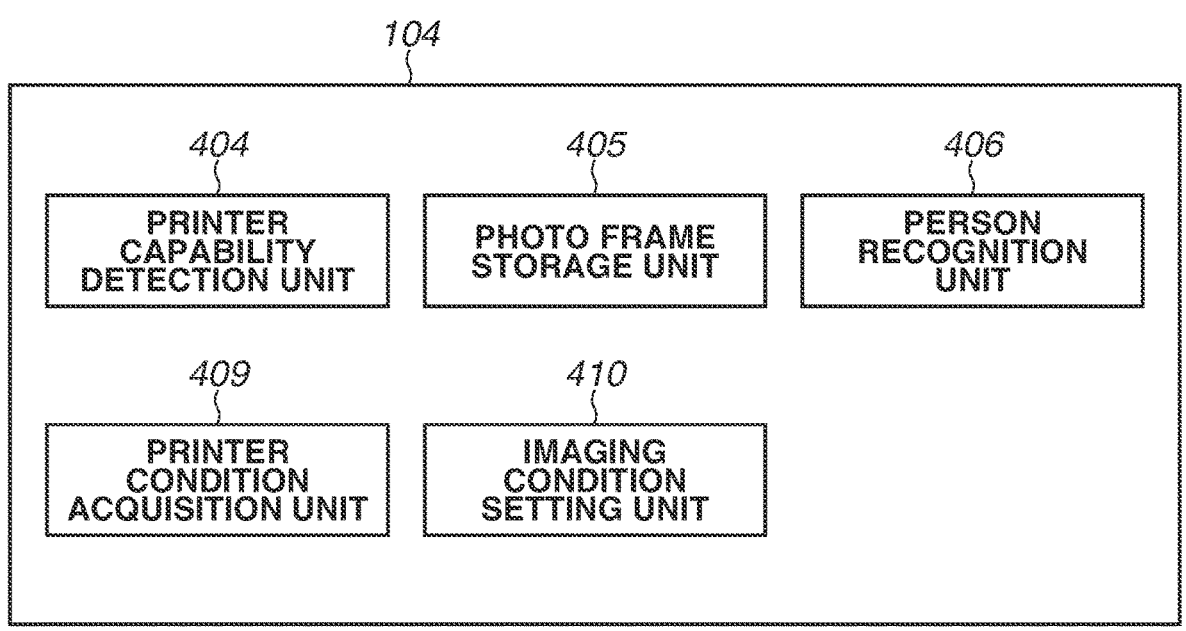
FIG. 4 is a block diagram illustrating an example of functional blocks included in the server.

Next, a block diagram illustrating functions included in the server 104 is described using FIG. 4. A printer capability detection unit 404 detects a capability of each of the printers 101 to 103 connected thereto via the wired LAN. An example of the capability to be detected is a printing speed. For example, information indicating how many sheets can be printed per minute is detected.

A photo frame storage unit 405 stores photo frame data. A result obtained by combining an image captured by the camera operator and the photo frame data is printed. A spectator can select a photo frame. Selection of the photo frame is described below with reference to FIG. 5.

A person recognition unit 406 analyzes an image captured by the camera operator and automatically recognizes the number of people in the captured image. More specifically, the person recognition unit 406 acquires picture information stored in the RAM 313 and recognizes a person in the picture information. Here, the person may be recognized based on the face thereof. The person recognition unit 406 analyzes a person in the captured image, and calculates the number of spectators in the captured image. The person recognition unit 406 can recognize face data of players in advance. Thus, the person recognition unit 406 calculates the number of people in image data of a picture and calculates the number of people who do not correspond to the face data of the players. For example, if the camera operator captures an image of one player and two spectators, there are three people in image data of the picture. The person recognition unit 406 calculates the number of faces in the image data and the number of faces that correspond to the face data of the players. Then, the person recognition unit 406 calculates the number of spectators by calculating a difference between these two numbers of faces. More specifically, in this example, the number of spectators is calculated as 3−1=2.

A printer condition acquisition unit 409 acquires the operating status of each of the printers 101 to 103, print paper remaining amount information, and ink remaining amount information. An imaging condition setting unit 410 notifies the digital camera of settings such as a resolution applied in image capturing and a compression method applied after the image capturing.

Figure 5:
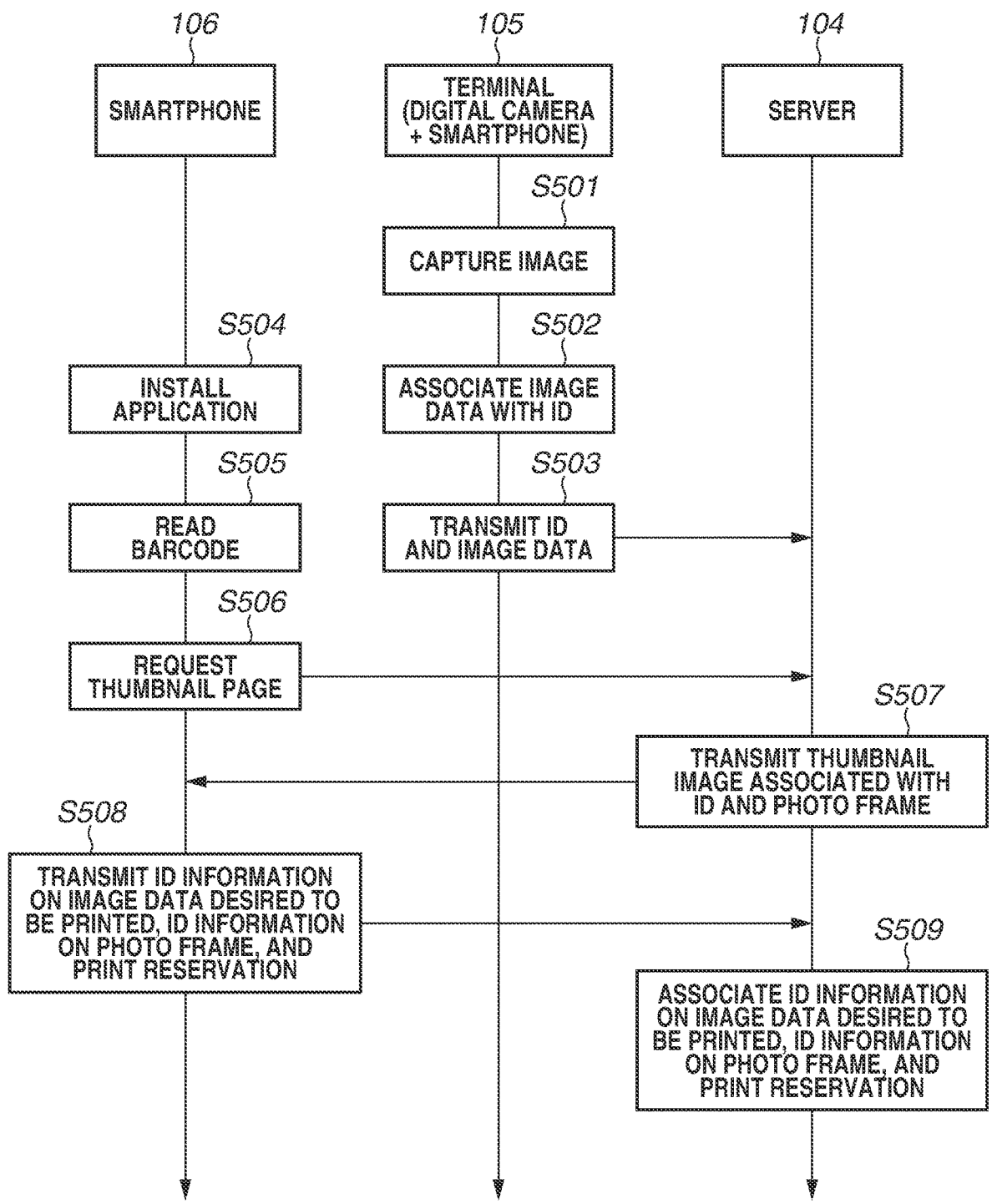
FIG. 5 is a sequence diagram illustrating a flow from image capturing to printing.
Figure 6:
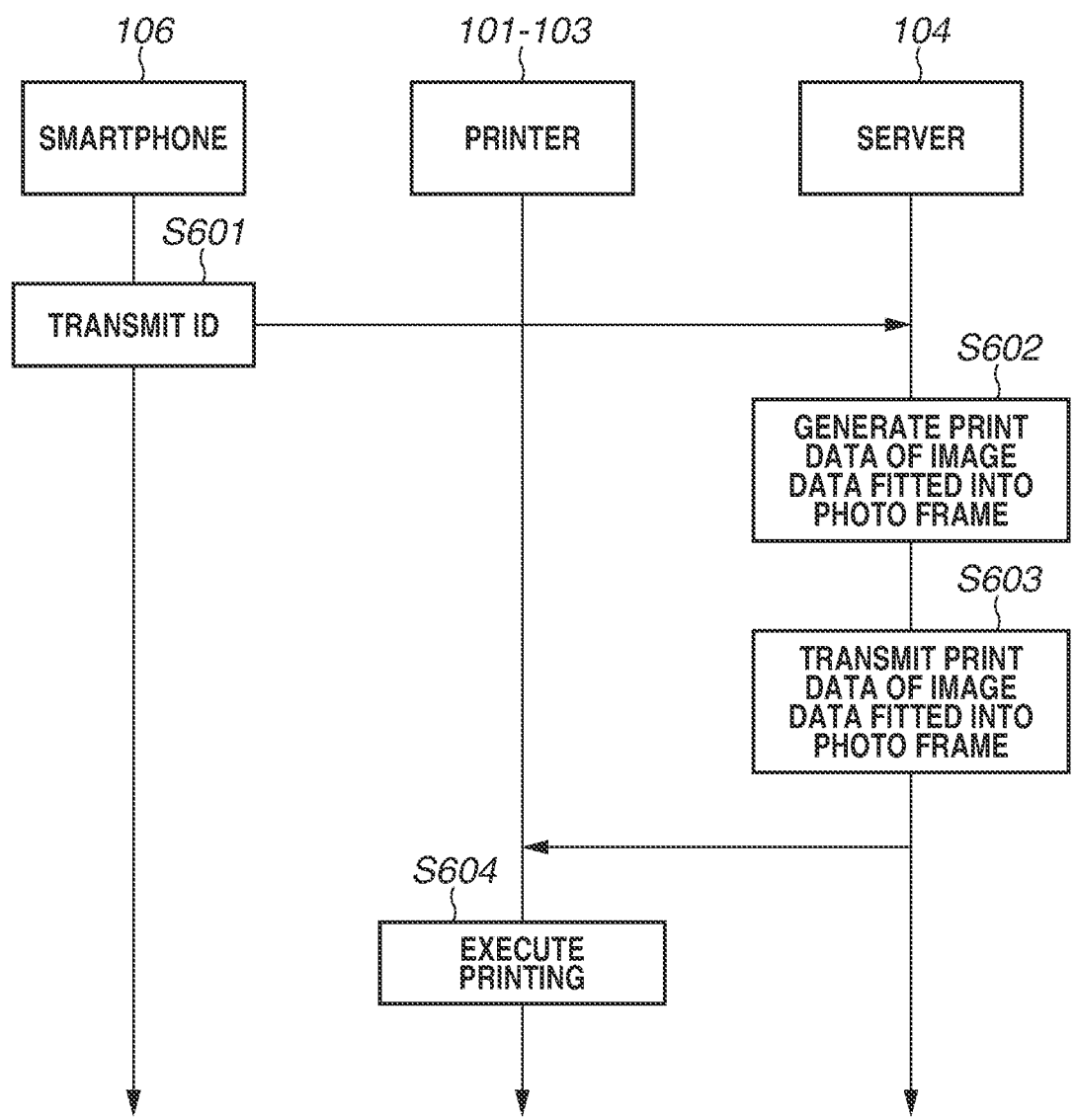
FIG. 6 is a sequence diagram illustrating a flow from image capturing to printing.

Next, a flow from image capturing to printing is described using FIGS. 5 and 6. Upon request from a spectator, the camera operator who is a professional captures an image of the spectator. Here, the camera operator has an ID sheet on which ID and a barcode associated with the ID are printed. Before capturing the image of the spectator, the camera operator captures images of the ID and the barcode on the ID sheet using the digital camera. Then, in step S501, the camera operator captures an image of the spectator. As a result, in step S502, the digital camera associates the ID acquired by capturing the image of the ID sheet with image data obtained by capturing the image of the spectator. Then, in step 503, the image data and the ID are transmitted to the smartphone of the camera operator that is connected to the digital camera via the USB. Here, the smartphone of the camera operator transmits the image data and the ID to the server 104. Through this processing, the server 104 stores the ID and the image data in association with each other in a table as illustrated in FIG. 12. After completion of the image capturing, the camera operator hands the ID sheet to the spectator.

Subsequently, in step S504, the spectator installs an application corresponding to a print service according to the present exemplary embodiment using the smartphone 106 carried by the spectator himself or herself. The ID sheet may have a Uniform Resource Locator (URL) or a barcode printed thereon used for downloading the application corresponding to the print service. Then, the smartphone 106 starts up the installed application. By the spectator operating on a screen of the application and selecting an image display function, a camera function of the smartphone 106 is started up so that the barcode on the ID sheet can be read. Then, in step S505, the smartphone 106 reads the barcode on the ID sheet, and in step S506, the smartphone 106 requests a thumbnail page from the server 104. More specifically, the smartphone 106 transmits, to the server 104, the ID obtained by reading the ID sheet and a request for displaying the image and photo frames.

If the server 104 receives the ID and the request for displaying the image and the photo frames from the smartphone 106, in step S507, the server 104 acquires a thumbnail image of the image data associated with the ID. In addition, the server 104 acquires the photo frames and transmits the thumbnail image and the photo frames to the smartphone 106.

The application on the smartphone 106 displays, on the screen of the application, the thumbnail images and the photo frames received from the server 104. The spectator operates on the screen of the application to select a thumbnail image and a photo frame and gives a print instruction. If the smartphone 106 receives the print instruction, in step S508, the smartphone 106 transmits, to the server 104, an image ID of an image desired to be printed as a picture, ID information on the selected photo frame, and a print reservation. In step S509, the server 104 manages the image ID of the image desired to be printed as a picture, the ID information on each photo frame, and the print reservation in association with the ID in a table as illustrated in FIG. 12.

Next, a sequence to be applied when the spectator receives the picture of the captured image in the print service area 14 is described using FIG. 6.

On the smartphone 106, the application is started up. In step S601, the smartphone 106 transmits the ID to the server 104 in the area 15. This ID refers to the ID printed on the ID sheet.

In a case where a print instruction is associated with the received ID, in step S602, the server 104 generates print data using the image data and the photo frame associated with the ID. Then, in step S603, the server 104 transmits the print data to a printer selected from among the printers 101 to 103. The print data is data obtained by fitting the image data into the photo frame. In step S604, each of the printers 101 to 103 executes print processing based on the received print data. As a result, the spectator can receive a printed material of an image captured by the camera operator at the image-capturing location 12. The printed material of the image is a printed material in which the image is fitted into the photo frame selected by the spectator.

The spectator can also acquire data for display that corresponds to the print data. For example, in step S508 described above in FIG. 5, the spectator selects a thumbnail image and a photo frame in addition to an acquisition request for the data for display. In response to this operation performed by the spectator, the smartphone 106 transmits, to the server 104, the acquisition request for the data for display, the ID of the image data of the image desired to be displayed, and the ID information on the photo frame. Subsequently, the server 104 generates the data for display based on image data corresponding to the thumbnail image selected by the spectator and the photo frame, and transmits the data for display to the smartphone 106. Through the above processing, the spectator can acquire the data for display in which the image is fitted into the photo frame.

Figure 7:
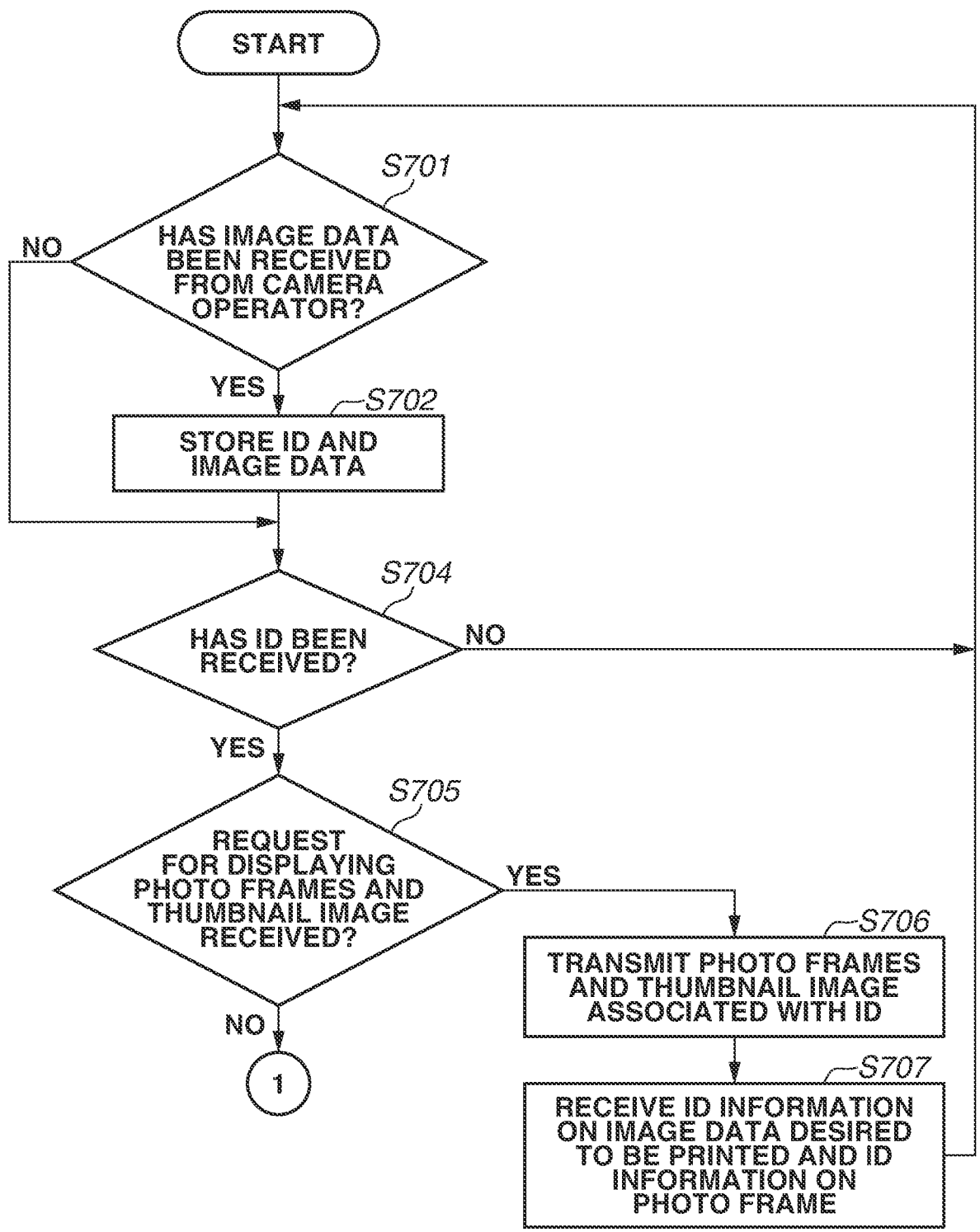
FIG. 7 is a flowchart illustrating processing to be executed by the server.

FIG. 7 illustrates a flowchart illustrating processing to be executed by the server 104. In the present exemplary embodiment, the flowchart to be executed by the server 104 is implemented by the CPU 311 reading a program related to the processing in the flowchart and executing the program.

In step S701, the CPU 311 determines whether image data of an image and an ID have been received from a smartphone via the digital camera carried by the camera operator. If the CPU 311 determines that the image data of the picture and the ID have been received (YES in step S701), in step S702, the CPU 311 stores the image data and the ID in association with each other. In step S702, information is stored in such a state as a state of ID 105 in FIG. 12. If the CPU 311 determines that image data of the picture and the ID have not been received (NO in step S701), the processing proceeds to step S704.

Subsequently, in step S704, the CPU 311 determines whether ID has been received from the smartphone 106 carried by the spectator. If the CPU 311 determines that the ID has not been received (NO in step S704), the processing returns to step S701. If the CPU 311 determines that the ID has been received from the smartphone 106 (YES in step S704), in step S705, the CPU 311 determine whether a request for displaying photo frames and thumbnail image has been received. As described above in step S506 in FIG. 5, the server 104 receives the ID and the request for displaying the image and the photo frames from the smartphone 106. If the display request is included, the CPU 311 determines that the request for displaying the photo frames and thumbnail images has been received (YES in step S705). If the display request is not included, the CPU 311 determines that the request for displaying the photo frames and thumbnail images has not been received (NO in step S705).

If the CPU 311 determines that the request for displaying the photo frames and thumbnail images has not been received (YES in step S705), in step S706, the CPU 311 transmits, to the smartphone 106 that is the transmission source of the ID, the photo frames and the thumbnail images of the image data stored in association with the ID in step S702. For example, the server 104 is notified of the Internet protocol (IP) address of the smartphone 106 together with the request for displaying, and therefore the server 104 transmits the thumbnail images and the photo frames to the smartphone 106 using such information.

Figure 8:
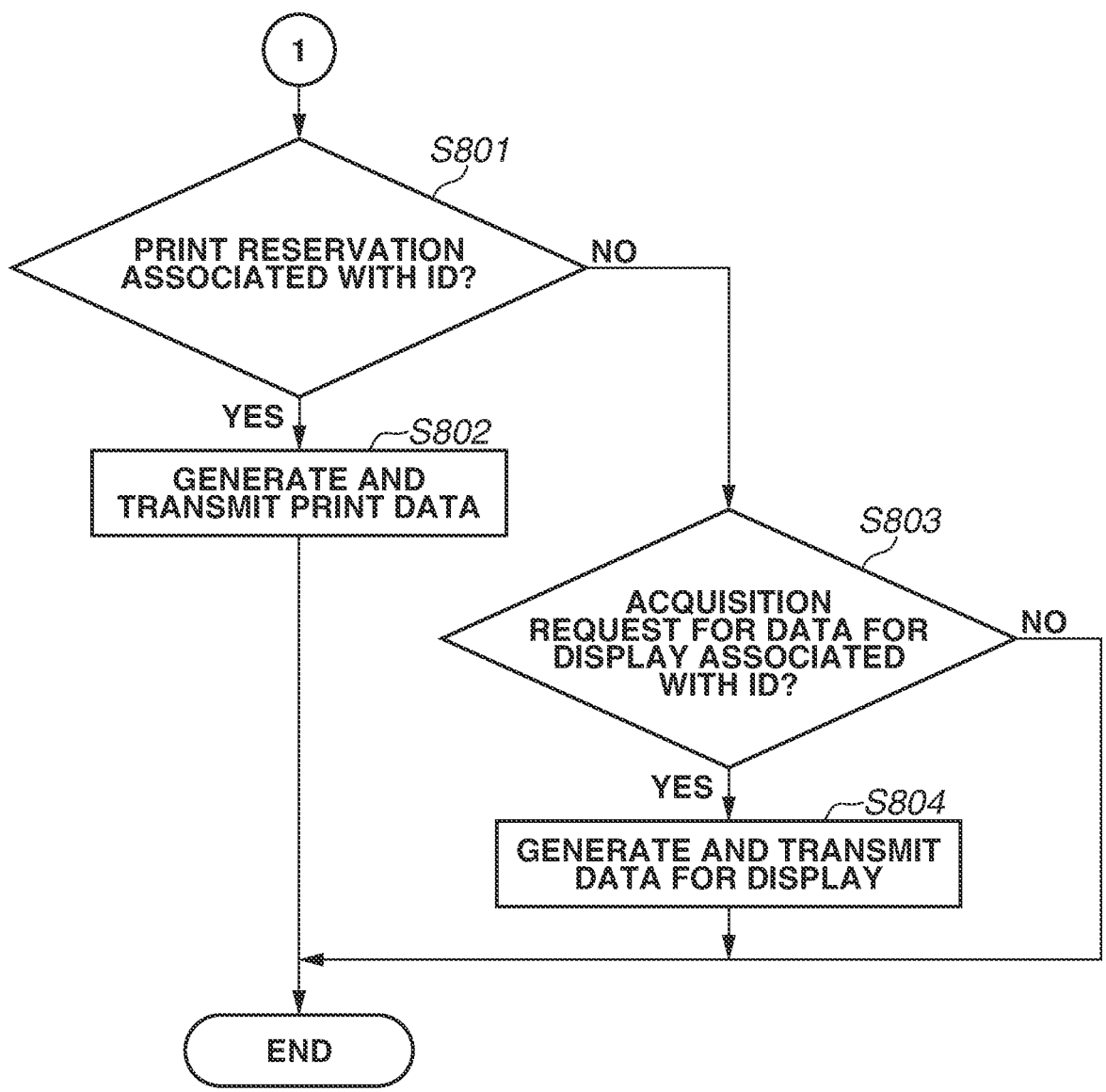
FIG. 8 is a flowchart illustrating processing to be executed by the server.

If the CPU 311 determines that the request for displaying the photo frames and thumbnail images has not been received (NO in step S705), the processing proceeds to step S801 in FIG. 8.

In step S707, the CPU 311 receives the ID information on the image data of the image desired to be printed, the ID information on the photo frame, and the print reservation from the smartphone 106 carried by the spectator. The CPU 311 stores the image data corresponding to the selected photo frame, the image data corresponding to the image desired to be printed as a picture, and the print reservation in association with the ID. In step S707, information is stored in such a state as a state of ID 102 in FIG. 12.

In step S801, the CPU 311 determines whether the print reservation is associated with the ID. If the CPU 311 determines that the print reservation is associated with the ID (YES in step S801), in step S802, the CPU 311 generates the print data using the image data and the photo frame associated with the ID and transmits the print data to the selected printer. The printer performs a rendering process on the received print data and prints the print data on a sheet. If the CPU 311 determines that the print reservation is not associated with the ID (NO in step S801), in step S803, the CPU 311 determines whether an acquisition request for the data for display is associated with the ID. If the CPU 311 determines that the acquisition request for the data for display is associated with the ID (YES in step S803), in step S804, the CPU 311 generates the data for display using the image data and the photo frame associated with the ID and transmits the data for display to the smartphone 106 that has made the request.

Through the above processing, the spectator can acquire the printed material or the data for display of the image data selected by the spectator himself or herself.

Figure 9:
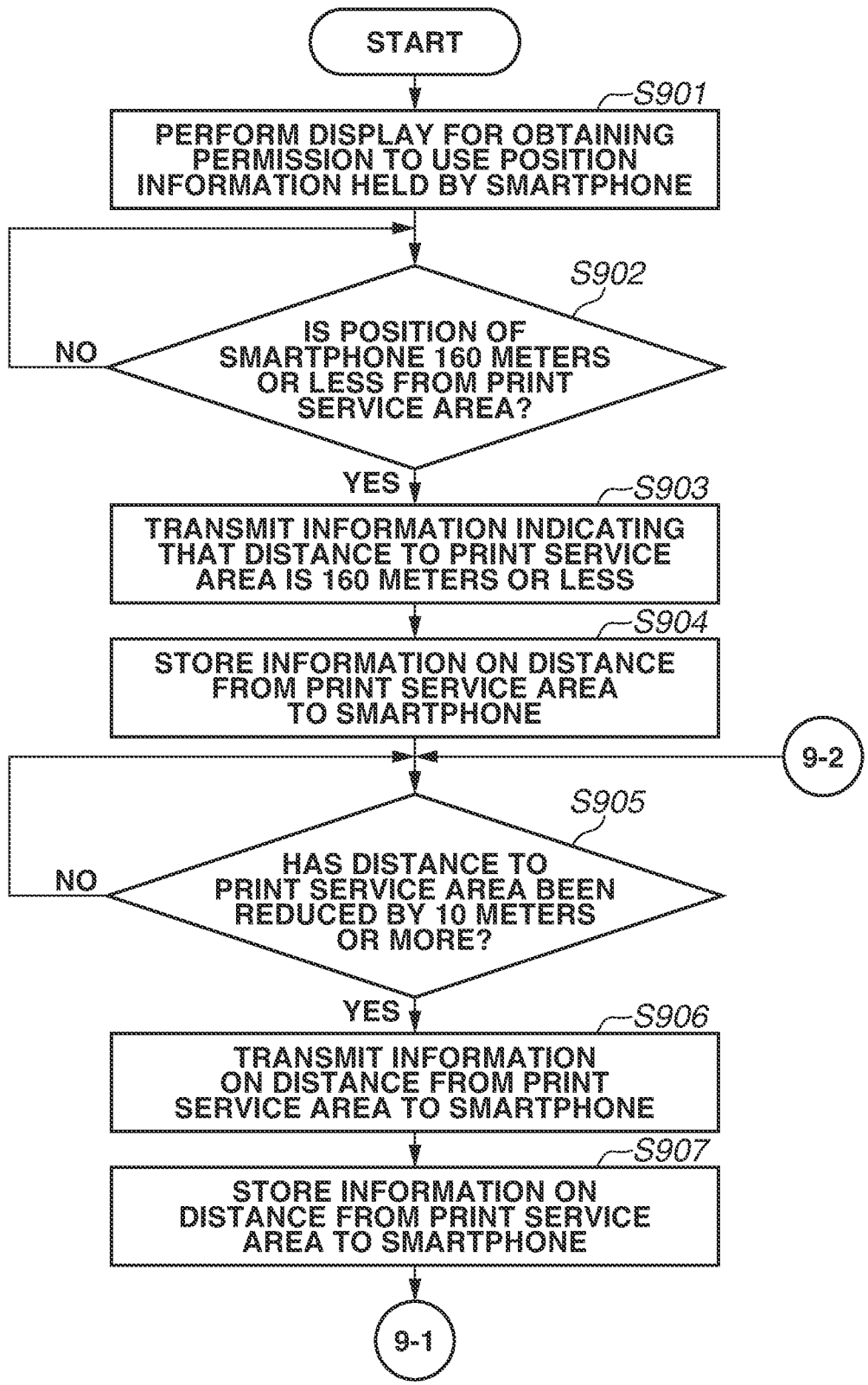
FIG. 9 is a flowchart illustrating processing to be executed by a smartphone.
Figure 10:
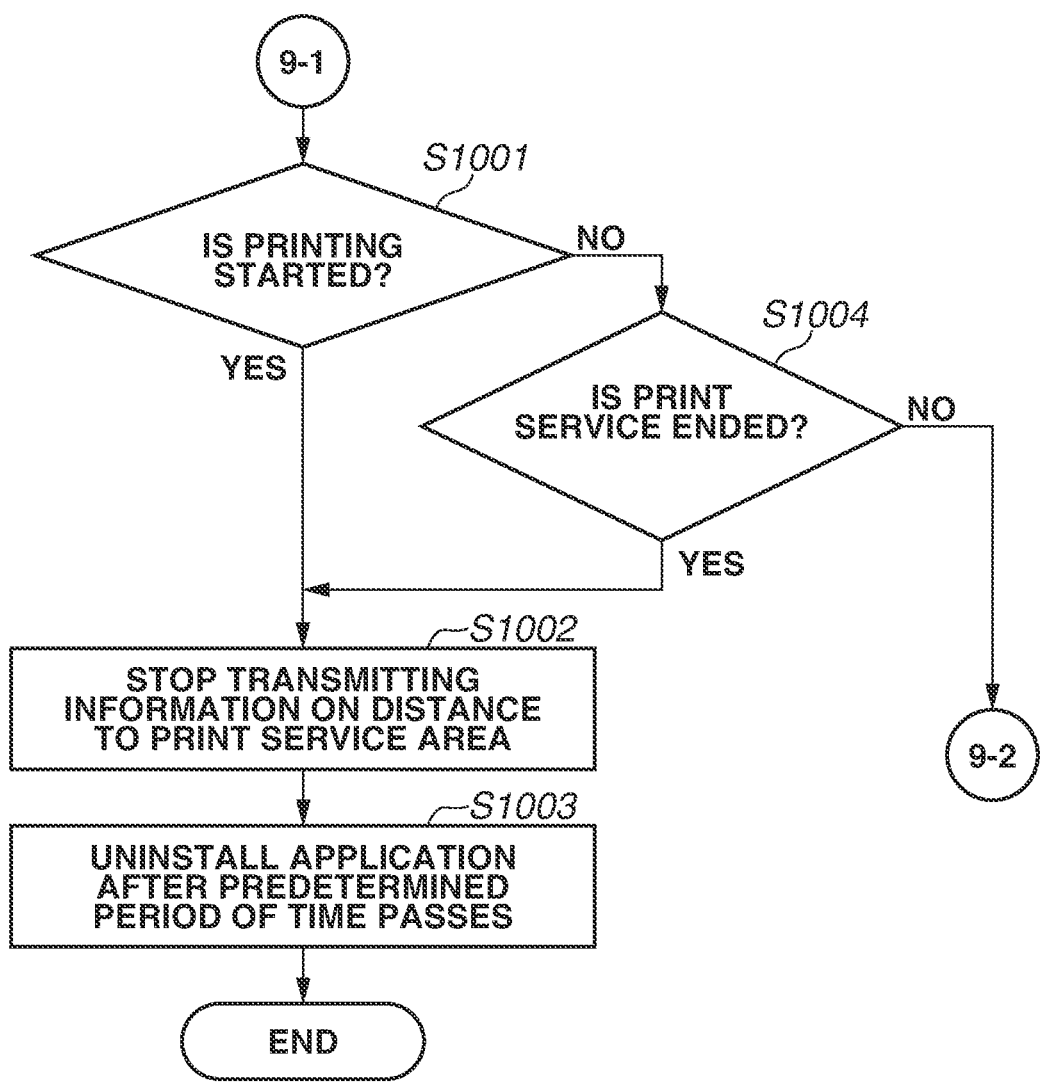
FIG. 10 is a flowchart illustrating processing to be executed by the smartphone.

Next, processing to be executed by the smartphone 106 is described using FIGS. 9 and 10. FIGS. 9 and 10 illustrate processing that is started if the print reservation is received in step 508 in FIG. 5. More specifically, the processing is to be executed using the application installed in step 504 in FIG. 5 described above. In the present exemplary embodiment, the flowchart to be executed by the smartphone 106 is implemented by a CPU 1101, which is to be described below in FIG. 11, reading a program related to the processing in the flowchart and executing the program. When the processing illustrated in FIG. 9 is executed, information (global positioning system (GPS) data) indicating a current position of the smartphone 106, which is acquired by the smartphone 106, is needed.

For that reason, in step S901, the CPU 1101 performs display processing for obtaining permission to use the position information held by the smartphone 106.

Subsequently, in step S902, the CPU 1101 determines whether a distance between the current position held by the smartphone 106 and the print service area 14 is a predetermined distance (for example, 160 meters) or less. More specifically, when the application is installed in step 504 in FIG. 5, position information on the print service area 14 is held by the smartphone 106. The processing in step S902 is executed based on the held position information on the print service area 14 and the current position information on the smartphone 106.

If the CPU 1101 determines that the distance is the predetermined distance or less (YES in step S902), in step S903, the CPU 1101 accesses the server 104 and transmits information indicating that the distance is 160 meters or less together with the ID to the server 104.

In step S904, the CPU 1101 stores distance information on the distance from the print service area 14 to the smartphone 106 at the time of execution of the processing in step S903.

In step S905, the CPU 1101 determines whether the distance from the smartphone 106 to the print service area 14 has been reduced by 10 meters or more from the distance indicated by the distance information transmitted to the server 104 the last time. More specifically, the CPU 1101 executes the processing in step S905 based on the distance information calculated from the current position information on the smartphone 106 and the position information on the print service area 14 and also based on the distance information stored in step S904.

If the CPU 1101 determines that the distance has been reduced by 10 meters or more (YES in step S905), in step S906, the CPU 1101 accesses the server 104 and transmits, together with the ID, the distance information calculated from the current position information on the smartphone 106 and the position information on the print service area 14 to the server 104. Subsequently, in step S907, the CPU 1101 stores the distance information transmitted in step S906.

In step S1001, the CPU 1101 determines whether printing is started. More specifically, when the server 104 instructs the printer to start the printing of the print data for the image data associated with the ID received in step S802, the server 104 notifies the smartphone 106 associated with the ID that the printing is started. The processing in step S1001 is implemented by determining whether the notification that the printing is started has been received.

If the CPU 1101 determines that the printing is started (YES in step S1001), in step S1002, the CPU 1101 stops measurement of the distance to the position of the print service area 14 and notification about the distance information to the server 104.

Subsequently, in step S1003, after a predetermined period of time passes, the CPU 1101 uninstalls the application installed in step 504 in FIG. 5. By waiting for the predetermined period of time to pass, it becomes more likely that the spectator uninstalls the application after the spectator receives the printed material. However, the CPU 1101 may uninstall the application immediately after the CPU 1101 determines that the printing is started in step S1001.

If the CPU 1101 determines that the printing is not started (NO in step S1001), in step S1004, the CPU 1101 determines whether the print service is ended. More specifically, the processing in step S1004 is implemented by determining whether the operation of the application installed in step 504 in FIG. 5 is stopped. Alternatively, the processing in step S1004 may be implemented by determining whether a print cancel button has been pressed by use of the application.

If the CPU 1101 determines that the print service is ended (YES in step S1004), the processing proceeds to step S1002.

If the CPU 1101 determines that the print service is not ended (NO in step S1004), the processing returns to step S905.

Figure 11:
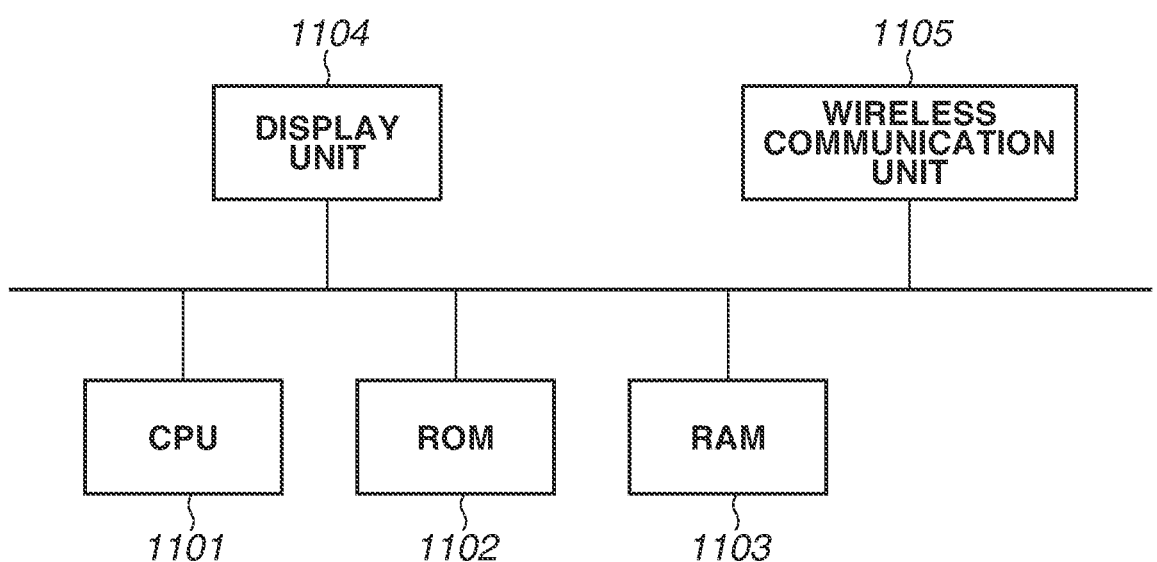
FIG. 11 is a block diagram illustrating an example of a hardware configuration of the smartphone.

Next, a diagram illustrating a hardware configuration of the smartphone 106 is described using FIG. 11.

The CPU 1101 is a processor for controlling each function to be executed in the smartphone 106. A ROM 1102 stores fixed data such as a control program to be executed by the CPU 1101, a data table, and a built-in OS program therein. In the present embodiment, each control program stored in the ROM 1102 is used for controlling software execution such as scheduling, task switching, and interrupt handling under the management of the built-in OS program stored in the ROM 1102. A RAM 1103 is used by the CPU 1101 for temporary storage and buffering of data as appropriate.

A wireless communication unit 1105 is used for performing wireless communication. The wireless communication unit 1105 basically has the same function as the wireless communication unit 303, and a detailed description thereof is omitted. The smartphone 106 may include a short-range wireless communication unit providing wireless communication with a speed lower than that of the above-described wireless communication. Examples of short-range wireless communication include near field communication (NFC), Bluetooth®, and Bluetooth® Low Energy (BLE). A display unit 1104 displays various kinds of information. The display unit 1104 is a touch panel system and may function as both a display unit and an input unit.

Next, the table managed by the server 104 is described using FIG. 12. The table in FIG. 12 holds the ID printed on the ID sheets, the number of copies to be printed, the information on the distance between the smartphone 106 carried by the spectator and the print service area 14, the printing status, the image ID, the photo frame ID, the request information, and the address of the smartphone 106. The request information is either the print reservation or the acquisition request for data for display. The address of the smartphone 106 is an IP address of the smartphone 106.

In FIG. 12, data of two records is held as information on ID 101. This indicates that one spectator has given an instruction to print two pictures.

Data of one record is held as information on the ID 102. This indicates that another spectator has given an instruction to print one picture.

As information on ID 104, information on the number of copies, the image ID, and the IP address of the smartphone 106 has been stored, while other columns are blank. This indicates that the processing has proceeded to step 506 in FIG. 5 and that the processing in step 507 and after has not been performed yet.

As information on ID 105, information on the number of copies and the image ID has been stored, while other columns are blank. This indicates that the processing has proceeded to step 503 in FIG. 5 and that the processing in step 506 and after has not been performed yet.

Next, a method for reducing a waiting time of each spectator by controlling timing at which the server 104 instruct the printer to start printing is described. In the present exemplary embodiment, the server 104 gives an instruction to start printing based on the distance information received from the smartphone 106 so that the waiting time of the spectator can be a predetermined time length A (for example, five minutes or less).

The server 104 starts printing while the spectator is approaching the print service area 14. For example, if any of the printers 101 to 103 is not in use for printing (i.e., is in a standby state for printing), a time length X to be used for printing can be calculated by multiplying one minute by the number of copies. If two or more of the printers 101 to 103 are not in use for printing, the server 104 instructs one of the two or more printers that are currently not in use for printing to start printing. If all the printers 101 to 103 are currently in use for printing, the server 104 selects a printer expected to be able to start printing the earliest among the printers 101 to 103. The server 104 calculates a time length that the selected printer needs to complete the printing current being processed thereby. For example, the time length is represented as Y.

A time length from a time when the spectator enters a certain area to a time when the spectator arrives at the print service area 14 is represented as T. A distance from an entrance of the area to the print service area 14 is represented as Z meters.

Based on the above, an equation "T+A=X+Y" holds, which is translated into "T=X+Y−A (Equation 1)". A walking speed of the spectator is assumed to be 1 km per hour on the assumption that a venue is crowded, which is translated into 16 meters per minute. Given the above conditions, "Z/16=T (Equation 2)" can be obtained.

The server 104 can obtain the time length T, which is needed for the spectator to arrive at the print service area 14, by dividing the distance information by the walking speed. The server 104 is notified by the smartphone 106 of the distance information in step S906 in FIG. 9 described below.

The server 104 performs the following processing to instruct the selected printer to start printing a picture so that a waiting time at the print service area 14 is a predetermined time length or less (for example, five minutes or less). More specifically, "Z/16=X+Y−A" is obtained based on Equations 1 and 2.

For example, A is set to five minutes. If the spectator desires to have 8 sheets printed, then X=8 (minutes). If there is a printer not in use for printing, then Y=0 (minutes). As a result, from Z/16=X+Y−A=8+0−5, Z/16=3 is obtained. Accordingly, the server 104 instructs the printer to start printing when Z=48 (meters). More specifically, when the server 104 detects that the spectator has entered an area within 48 meters from the print service area 14 (i.e., after the server 104 receives the distance information indicating 48 meters or less in step S906), the server 104 instructs the printer to start printing.

If the spectator desires to have one sheet printed under the same conditions, then X=1 (minute). If there is a printer not in use for printing, then Y=0 (minutes). As a result, from Z/16=X+Y−A=1+0−5=−4, Z=−64 (meters) is calculated. More specifically, when Z has a negative value, the server 104 sets Z=0. As a result, the server 104 instructs the printer to start printing after the spectator arrives at the print service area 14 (i.e., after the server 104 receives notification of 0 meters in step S906).

Next, a description is given of a case where all of the printers 101 to 103 are in use for printing. In this case, it is assumed that the spectator desires to have 3 sheets printed (i.e., X=3). The printer expected to complete printing the earliest needs three minutes to complete the printing current being processed (i.e., Y=3). Given the above conditions, Z/16=3+3−5=1. In other words, Z=16 (meters) is calculated. Accordingly, the server 104 instructs the printer to start printing after the spectator arrives at an area within 16 meters from the print service area 14 (i.e., after the server 104 receives the distance information indicating 16 meters or less in step S906).

Figure 13A:
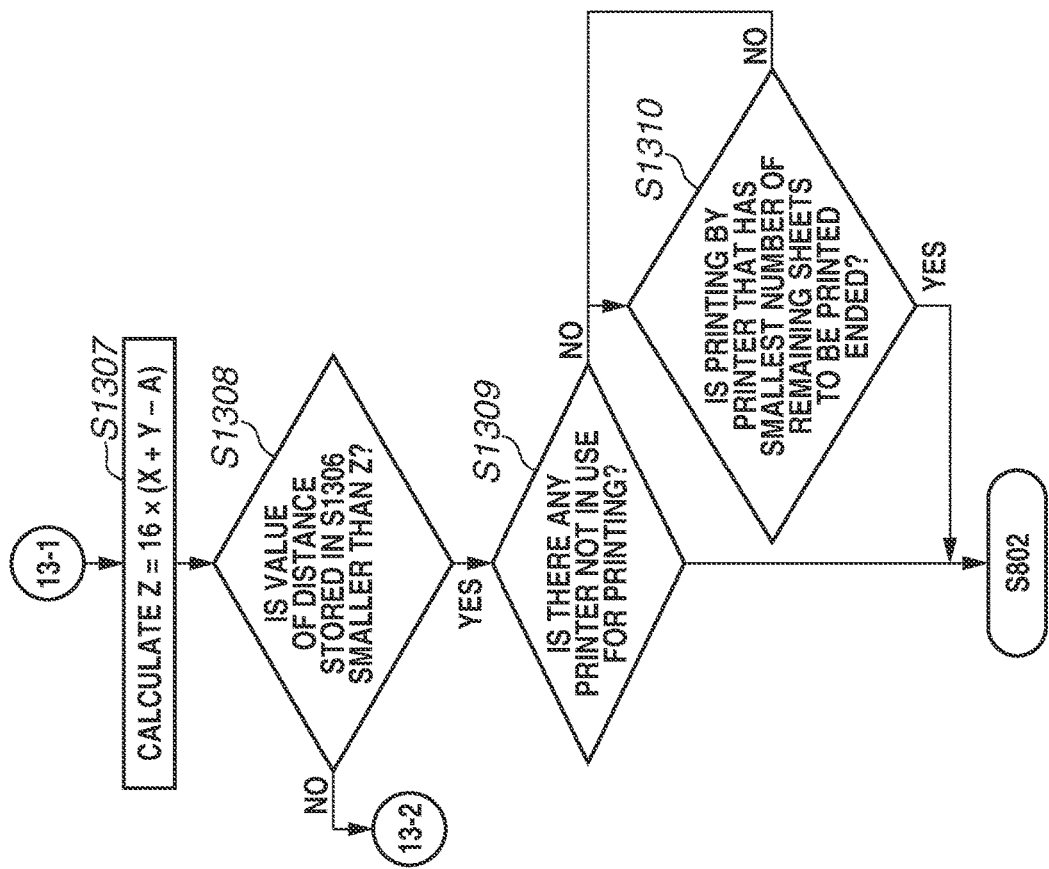
FIGS. 13A and 13B are flowcharts illustrating processing to be executed by the server.
Figure 13B:
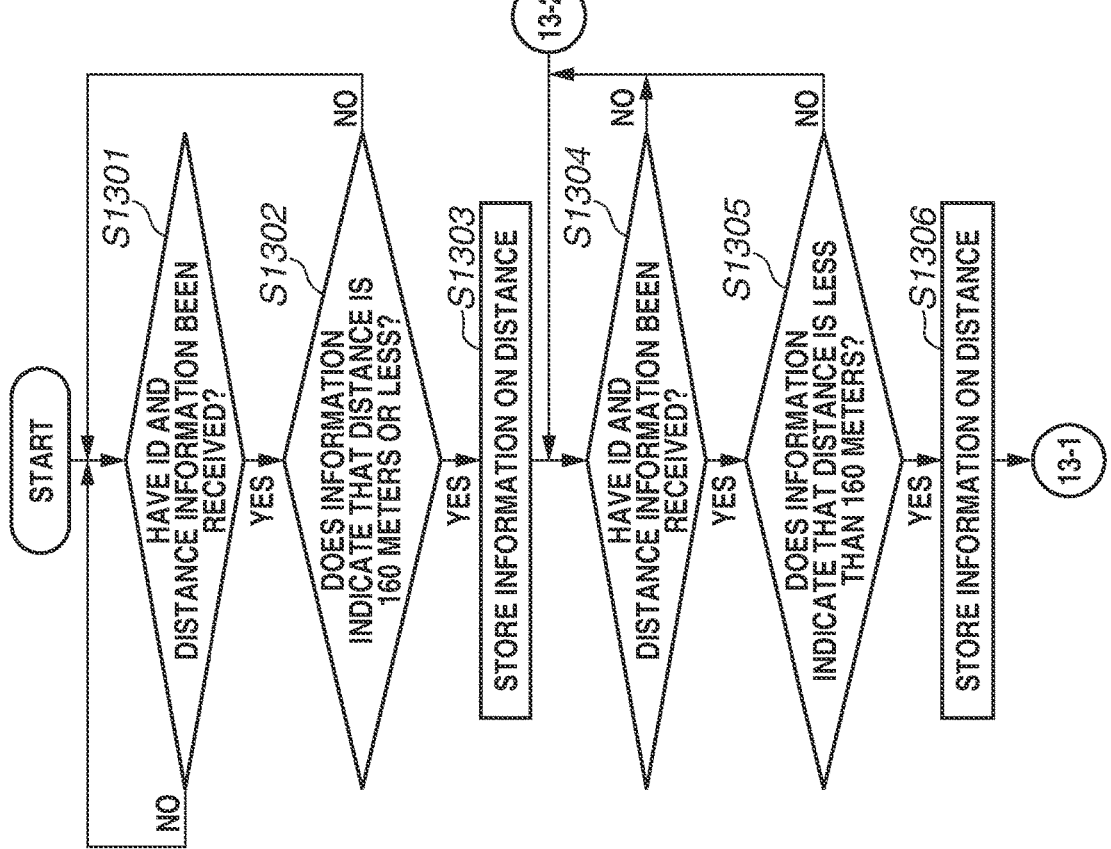

FIGS. 13A and 13B are flowcharts of processing for giving an instruction to start printing to be executed by the server 104. The processing in FIGS. 13A and 13B is started, for example, if the CPU 311 determines that the print reservation is associated with the ID (YES in step S801) in FIG. 8.

In step S1301, the CPU 311 determines whether the ID and the distance information have been received. If the CPU 311 determines that the ID and the distance information have been received (YES in step S1301), in step S1302, the CPU 311 determines whether the information received in step S1301 is information indicating that the spectator is within a distance of 160 meters or less. In other words, the CPU 311 determines whether the CPU 311 has received the information transmitted by the smartphone 106 in step S903 in FIG. 9.

If the CPU 311 determines that the CPU 311 has received the information (YES in step S1302), in step S1303, the CPU 311 stores the information received in step S1301 in the table illustrated in FIG. 12. If the CPU 311 determines that the CPU 311 has not received the information (NO in step S1302), the processing returns to step S1301.

Subsequently, in step S1304, the CPU 311 determines whether the ID and the distance information have been received. In other words, information acquired in this step is the distance information indicating the distance between the smartphone 106 carried by the spectator and the print service area 14, and the ID. If the CPU 311 determines that the ID and the distance information have been received (YES in step S1304), in step S1305, the CPU 311 determines whether the received distance information is distance information indicating the distance is less than 160 meters. If the CPU 311 determines that the received distance information is the distance information indicating the distance is less than 160 meters (YES in step S1305), in step S1306, the CPU 311 stores, in the table in FIG. 12, the distance information that has been determined to indicate the distance is 160 meters or less in step S1305.

Subsequently, in step S1307, the CPU 311 calculates Z=16× (X+Y−A) based on the above described equations. Then, in step S1308, the CPU 311 determines whether the distance stored in step S1306 has a value smaller than Z, which has been calculated in step S1307.

If the CPU 311 determines that the distance stored in step S1306 has the value smaller than Z (YES in step S1308), in step S1309, the CPU 311 determines whether there is any printer not in use for printing among the printers 101 to 103. If the CPU 311 determines that the distance stored in step S1306 does not have the value smaller than Z (NO in step S1308), it indicates that the spectator has not yet reached a position at which printing is to be started. Thus, the processing returns to step S1304.

If the CPU 311 determines that there is a printer not in use for printing (YES in step S1309), the CPU 311 generates the print data using the image data and the photo frame that are associated with the ID received in step S1301. In other words, the CPU 311 executes step S802 in FIG. 8. Accordingly, if the CPU 311 determines that there is the printer not in use for printing (YES in step S1309), the CPU 311 transmits the print data to the printer specified in step S1308 as the printer not in use for printing and instructs the printer to start printing.

If the CPU 311 determines that all of the printers 101 to 103 are in use for printing (NO in step S1309), in step S1310, the CPU 311 specifies a printer that has the smallest number of remaining sheets to be printed among the printers 101 to 103, and then determines whether the printing by the specified printer is ended. If the CPU 311 determines that there is the printer not in use for printing (YES in step S1309), the CPU 311 generates the print data using the image data and the photo frame that are associated with the ID received in step S1301. In other words, the CPU 311 executes step S802 in FIG. 8. If the CPU 311 determines that there is the printer not in use for printing (YES in step S1310), the CPU 311 transmits the print data to the printer specified in step S1310 and instructs the printer to start printing.

Through the above-described processing, if the distance indicated by the acquired distance information is smaller than the predetermined distance (i.e., Z), the server 104 instruct the printer in the print service area 14 to start printing of the image data associated with the acquired ID. The server 104 determines the predetermined distance (i.e., Z) so that the waiting time to be experienced by the spectator for receiving the printed material in the print service area 14 is the predetermined time length or less. Through this processing, the server 104 can reduce the waiting time to be experienced by the spectator in the print service area 14.

The processing described below may be performed in addition to the above-described processing. For example, the smartphone 106 acquires information indicating an orientation of the smartphone 106 in addition to the distance information. Then, the processing may proceed to step S1308 if the distance is 160 meters or less (YES in step S1305) and if the smartphone 106 is oriented toward the print service area 14.

Furthermore, timing to start printing can be determined by taking into consideration a length of transfer time (for example, represented by W) needed for the server 104 to transfer the print data to the printer. In other words, the server 104 can calculate Z by using an equation "Z+A=X+Y+W".

Even if the timing to start printing is determined based on the above calculation, in a case where the number of spectators who visit the print service area 14 significantly increases, the waiting time of the spectator can increase. Thus, if the result of determination in step S1309 is still NO even after a predetermined time period has passed since the start of the processing in step S1309, the server 104 instructs the smartphone carried by the camera operator to change settings for image capturing. More specifically, the server 104 gives an instruction to switch an image-capturing mode to capture an image with a lower resolution. As a result, a transfer speed of the data from the server 104 to the printers 101 to 103 can be increased and a length of time from start to completion of printing by each of the printers 101 to 103 can be reduced, whereby the waiting time of the spectator can be shortened.

The server 104 can modify the value of Z depending on an imaging condition of the digital camera. For example, if the size of a picture is set to a large size at the time of image capturing, the server 104 multiplies the value of Z by 1.2. If the size of a picture is set to a small size at the time of image capturing, the server 104 multiplies the value of Z by 0.8. The values are merely examples, and a coefficient of the value of Z is set larger as the size set at the time of image capturing is larger and is set smaller as the size set at the time of image capturing is smaller.

The server 104 can modify the value of Z depending on the capability of each of the printers 101 to 103. For example, the server 104 multiplies the value of Z by 1.1 when the printing speed of the printer is between 15 prints per minute (PPM) to 20 PPM. Further, the server 104 multiplies the value of Z by 1.2 when the printing speed of the printer is less than 15 PPM. The values are merely examples, and the coefficient of the value of Z is set larger as a value of PPM is smaller.

In FIGS. 13A and 13B, the server 104 gives an instruction to start printing when the printer that has the smallest number of remaining sheets for printing completes printing in step S1310. However, the server 104 can give the instruction at timing different from the above. More specifically, if the CPU 311 determines that all of the printers 101 to 103 are in use for printing (NO in step S1309), the server 104 specifies a printer that has the smallest number of remaining sheets for printing among the printers 101 to 103, and can instruct the printer to start printing without waiting for completion of the printing of the remaining sheets. This processing enables execution of more efficient printing.

Next, as a second exemplary embodiment, processing is described in which the number of people in a picture is detected and the number of copies of the picture to be printed is determined. Conventionally, a technique for reducing an operational load involved in setting the number of copies to be printed has not been considered.

Figure 14:
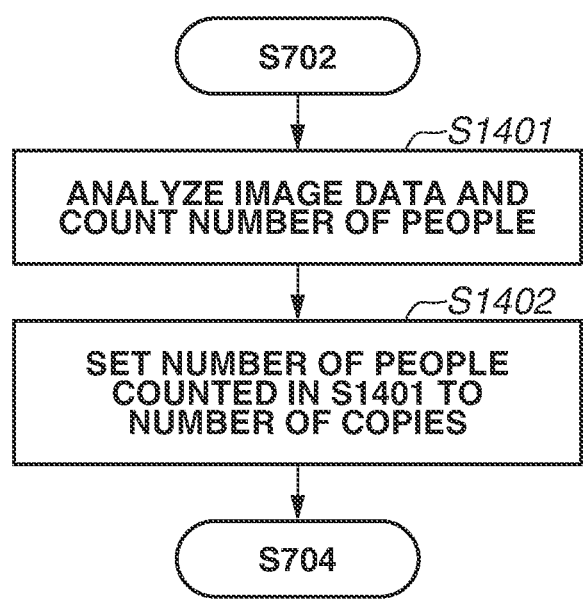
FIG. 14 is a flowchart illustrating processing to be executed by the server.

FIG. 14 illustrates a flowchart illustrating processing executed by the server 104. The processing in FIG. 14 is executed subsequent to the processing in step S702 according to the first exemplary embodiment.

After the CPU 311 stores the received ID and information for specifying image data in the table in FIG. 12, in step S1401, the CPU 311 counts the number of people in the received image data. More specifically, the number of people in the image data to be printed is counted.

Subsequently, in step S1402, the CPU 311 sets the value obtained by the counting in step S1401 as the number of copies in the table in FIG. 12.

Through the above processing, in a case where the CPU 311 generates print data and gives an instruction to start printing in step S802, the CPU 311 can give the instruction by referring to the table in FIG. 12 and setting information held in a field for the number of copies as the number of copies to be printed. As a result, the number of printed materials corresponding to the number of people in the picture can be easily obtained.

In counting the number of people in step S1401, the number of people may be counted excluding an unrelated person who happened to be in the picture. For example, in counting the number of people in step S1401, the CPU 311 may count the number of people on which the digital camera has focused. The CPU 311 may count the number of people in another manner. For example, the CPU 311 may first detect a main person and then count the number of people based on information on a distance between each person in the same picture and the digital camera.

The CPU 311 may count the number of people in still another manner. Specifically, in step S1402, the CPU 311 sets a value obtained by subtracting the number of players from the number of people counted in step S1401. More specifically, the server 104 stores face information on players before executing the print service. Then, the number of people corresponding to the face information on players among face information on the people detected in step S1401 is specified. Subsequently, the CPU 311 can set, as the number of copies in step S1402, a difference between the number of people counted from the picture and the number of people specified as players. This processing enables implementation of efficient printing. The face information on players stored in the server 104 may be face information on all players of a team or may be only players scheduled to visit the image-capturing location 12. Furthermore, machine learning can be applied to a method for specifying a player.

For example, a machine learning unit generates a learned model using image data of a profile of a player A, image data of a full face of the player A, and image data of a three-quarter face of the player A as input data and using information that these pieces of face information are on "player A" as teaching data. More specifically, the machine learning unit generates the learned model by associating the above described plurality of pieces of input data with the teaching data and learning by using a neural network. In other words, the learned model can also be described as a learned model for specifying the players. Subsequently, an estimation unit performs estimation by inputting data to the learned model generated by the machine learning unit. As the input data, image data specified based on the ID used for the determination in step S801 is used. The data input to the learned model by the estimation unit is desirably data used by the machine learning unit as input data for the learning. In other words, the input data is desirably image data that includes the profile, the full face, or the three-quarter face of the player A. Subsequently, the estimation unit obtains a result that the player A has been specified as output data based on estimation data output from the learned model. While the player A is described in the present exemplary embodiment, all the players of the team may be subjected to the same processing, or the players who are scheduled to visit the image-capturing location 12 may be subjected to the same processing. The machine learning unit and the estimation unit may be provided in the server 104. Alternatively, the machine learning unit may be provided in an apparatus different from the server 104, and the estimation unit may be provided in the server 104. In such a case, a learned model generated by the machine learning unit provided in the different apparatus is stored in the server 104.

In the present exemplary embodiment, the server 104 is configured to execute processing to set the number of copies. However, for example, a smartphone or the like having the same function may set the number of copies to be printed through the same processing.

According to the present exemplary embodiment, an operational load involved in setting the number of copies to be printed can be reduced.

As a third exemplary embodiment, an example is described in which the maximum number of copies allowed to be printed is determined for each spectator. In such a case, for example, the maximum printing capability of printers is 4800 sheets. In addition, the maximum number of copies allowed to be printed is initially set to three for each spectator's ID. However, if the total number of sheets that have been printed by the printers exceeds a threshold (for example, 3500 sheets), thereafter, the server 104 changes the maximum number of copies allowed to be printed to two for each spectator who desires to have a picture printed therefor. In other words, the server 104 reduces the maximum number of sheets allowed to be printed for each spectator based on a cumulative total number of sheets that have been printed in the print service area 14.

As an example where the maximum number of sheets is changed, the maximum number of sheets may be changed depending on the number of spectators who are present at the stadium 10. More specifically, if the number of spectators who are present at the stadium 10 exceeds a threshold (for example, 10,000), thereafter, the server 104 can change the maximum number of sheets to two for each spectator who desires to have a picture printed therefor. The numbers of sheets described above such as the maximum number of sheets, the threshold, and the maximum printing capability are merely examples and can be other values.

Even if the maximum number of sheets is changed in this example, the server 104 may allow the maximum number of sheets to be exceeded in a case where the second exemplary embodiment is implemented. More specifically, the above-described change of the maximum number of sheets is a function to prevent each spectator from selecting the number of pictures exceeding the maximum number of copies allowed to be printed. Thus, for example, if the number of pictures within the maximum number of sheets allowed to be printed is selected, and if the number of people that exceeds the maximum number of sheets allowed to be printed is in the pictures, the server 104 may instruct the printer to print the number of copies equal to the number of people in the pictures.

In the above-described exemplary embodiments, Z is calculated using the equations. However, machine learning may be used instead. A machine learning unit generates a learned model using the number of spectators as input data and using Z as teaching data. For example, the machine learning unit associates the input data with the teaching data, such as Z=50 if the number of spectators is 10,000 or less, Z=70 if the number of spectators is between 10,000 and 20,000, and Z=100 if the number of spectators is 20,000 or more. The machine learning unit generates the learned model by associating the input data with the teaching data as above and learning by using a neural network. In other words, the learned model can also be described as a learned model for determining the timing to start printing. Subsequently, an estimation unit performs estimation by inputting data to the learned model generated by the machine learning unit. As the input data, the received number of spectators is used. The data input to the learned model by the estimation unit is desirably data used by the machine learning unit as input data for the learning. In other words, the input data is desirably information on the number of spectators. Subsequently, the estimation unit obtains the value of Z as output data based on estimation data output from the learned model. The machine learning unit and the estimation unit may be provided in the server 104. Alternatively, the machine learning unit may be provided in an apparatus different from the server 104, and the estimation unit may be provided in the server 104. In such a case, a learned model generated by the machine learning unit provided in the different apparatus is stored in the server 104.

In the above-described exemplary embodiments, a configuration is described in which the server 104 generates print data, and the printer performs a rendering process on the print data. However, the server 104 can perform processing up to the rendering process and transmit a result of the rendering process to the printer.

The value of Z can be calculated using various kinds of information in addition to the information described in the above-described exemplary embodiments. For example, a resolution of the digital camera at the time of imaging, a compression method, and the number of printers may be used additionally.

According to the exemplary embodiments of the present disclosure, the length of waiting time for receiving the printed materials can be reduced.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-034905, filed Feb. 27, 2019, which is hereby incorporated by reference herein in its entirety.

What is claimed is:

1. An information processing apparatus comprising:
   one or more processors; and
   one or more memories storing instructions that, when executed by the one or more processors, cause the information processing apparatus to:
     register information on a certain person before acquiring image data to be printed;
     specify a number of certain persons in the image data to be printed based on the image data to be printed and the information on the certain person;
     determine a number of copies to be printed based on a number of people obtained by subtracting the specified number of certain persons from a number of people detected from the image data to be printed;
     give an instruction for printing the determined number of copies;
     receive identification information and image data of an image captured by a first apparatus;
     manage the identification information and the image data in association with each other; and
     receive distance information and identification information from a second apparatus carried by a user, the distance information indicating a distance between the second apparatus and a print service area,
   wherein, in a case where the distance indicated by the received distance information is smaller than a predetermined distance, the one or more processors instruct a printing apparatus in the print service area to start printing image data associated with the received identification information.

2. The information processing apparatus according to claim 1, wherein the one or more processors calculate the predetermined distance so that a waiting time of the user to receive a printed material in the print service area is a predetermined time length or less.

3. The information processing apparatus according to claim 2, wherein the one or more processors select, in a case where no printing apparatus in the print service area is in a standby state for printing, a printing apparatus expected to complete printing the earliest among printing apparatuses in the print service area,
   wherein the predetermined distance is determined based on the determined number of copies, a printing speed of the selected printing apparatus, a time length for the selected printing apparatus to complete printing, and the predetermined time length.

4. The information processing apparatus according to claim 1, wherein the one or more processors specify the number of certain persons with use of a learned model generated based on the image data of the certain person.

5. The information processing apparatus according to claim 4, wherein the learned model is generated through machine learning.

6. The information processing apparatus according to claim 1, wherein the first apparatus is a camera, and the second apparatus is a smartphone.

7. The information processing apparatus according to claim 1, wherein the second apparatus acquires the identification information obtained by capturing a barcode.

8. A control method to be executed in an information processing apparatus, the control method comprising:
   registering information on a certain person before acquiring image data to be printed;
   specifying a number of certain persons in the image data to be printed based on the image data to be printed and the information on the certain person;
   determining a number of copies to be printed based on a number of people obtained by subtracting the specified number of certain persons from a number of people detected from the image data to be printed;
   giving an instruction for printing the determined number of copies;
   receiving identification information and image data of an image captured by a first apparatus;
   managing the identification information and the image data in association with each other; and
   receiving distance information and identification information from a second apparatus carried by a user, the distance information indicating a distance between the second apparatus and a print service area,
   wherein, in a case where the distance indicated by the received distance information is smaller than a predetermined distance, a printing apparatus in the print service area is instructed to start printing image data associated with the received identification information.

9. The control method according to claim 8, wherein the predetermined distance is calculated so that a waiting time of the user to receive a printed material in the print service area is a predetermined time length or less.

10. The control method according to claim 9,
   wherein, in a case where no printing apparatus in the print service area is in a standby state for printing, a printing apparatus expected to complete printing the earliest among printing apparatuses in the print service area is selected, and
   wherein the predetermined distance is determined based on the determined number of copies, a printing speed of the selected printing apparatus, a time length for the selected printing apparatus to complete printing, and the predetermined time length.

11. The control method according to claim 8, wherein the number of certain persons is specified with use of a learned model generated based on the image data of the certain person.

12. The control method according to claim 11, wherein the learned model is generated through machine learning.

13. The control method according to claim 8, wherein the first apparatus is a camera, and the second apparatus is a smartphone.

14. The control method according to claim 8, wherein the second apparatus acquires the identification information obtained by capturing a barcode.

15. A non-transitory computer-readable storage medium that stores a program for causing an information processing apparatus to execute a control method, the control method comprising:

registering information on a certain person before acquiring image data to be printed;

specifying a number of certain persons in the image data to be printed based on the image data to be printed and the information on the certain person;

determining a number of copies to be printed based on a number of people obtained by subtracting the specified number of certain persons from a number of people detected from the image data to be printed;

giving an instruction for printing the determined number of copies;

receiving identification information and image data of an image captured by a first apparatus;

managing the identification information and the image data in association with each other; and receiving distance information and identification information from a second apparatus carried by a user, the distance information indicating a distance between the second apparatus and a print service area, wherein, in a case where the distance indicated by the received distance information is smaller than a predetermined distance, a printing apparatus in the print service area is instructed to start printing image data associated with the received identification information.

16. The non-transitory computer-readable storage medium according to claim 15, wherein the predetermined distance is calculated so that a waiting time of the user to receive a printed material in the print service area is a predetermined time length or less.

17. The non-transitory computer-readable storage medium according to claim 16, wherein, in a case where no printing apparatus in the print service area is in a standby state for printing, a printing apparatus expected to complete printing the earliest among printing apparatuses in the print service area is selected, and wherein the predetermined distance is determined based on the determined number of copies, a printing speed of the selected printing apparatus, a time length for the selected printing apparatus to complete printing, and the predetermined time length.

18. The non-transitory computer-readable storage medium according to claim 15, wherein the number of certain persons is specified with use of a learned model generated based on the image data of the certain person.

19. The non-transitory computer-readable storage medium according to claim 18, wherein the learned model is generated through machine learning.

20. The non-transitory computer-readable storage medium according to claim 15, wherein the first apparatus is a camera, and the second apparatus is a smartphone.

21. The non-transitory computer-readable storage medium according to claim 15, wherein the second apparatus acquires the identification information obtained by capturing a barcode.

* * * * *